United States Patent [19]

Gregovich

[11] Patent Number: 5,797,117
[45] Date of Patent: Aug. 18, 1998

[54] MONTH FIELD DIVISION MULTIPLEXING SOLUTION FOR YEAR 2000 COMPUTER DATE PROBLEM

[76] Inventor: Slavomir Gregovich, 1227 11th St., #B, Santa Monica, Calif. 90401

[21] Appl. No.: 862,081

[22] Filed: May 24, 1997

Related U.S. Application Data

[60] Provisional application No. 60/037,474 Feb. 7, 1998.

[51] Int. Cl.$^6$ ....................................... G06F 17/00
[52] U.S. Cl. .......................... 707/101; 341/82; 364/770; 705/5; 705/6; 705/7; 705/8; 705/9
[58] Field of Search ..................... 707/1–7, 100–102, 707/104; 341/81–86; 364/768–772; 705/5–9

[56] References Cited

U.S. PATENT DOCUMENTS 5,600,836  2/1997  Alter .................................. 395/612

OTHER PUBLICATIONS http://www.year2000.com/cgi–bin/y2k/NFyear2000.cgi, 1998.
http://www.year2000.com/vendors/informatics.html, 1998.
http://nj5.injersey.com/~stout, 1998.
http://www.19t0.com/solved.htm, 1998.
http://www.wolfram.com/news/press2000.html, 1998.
http://www.year2000.com/vendors/21cent/21cent.html, 1998.
http://www.itl.nist.gov/div897/info2000.htm, 1998.
http://www.mccabe.com/nist/, 1998.
http://www.mccabe.com/v2000/methodology.html, 1998.
http://www.mccabe.com/tool/metrics.html, 1998.
http://www.mccabe.com/tech/year2000_compliance.html, 1998.
http://www.viasoft.com/prdcts/esw/eswe.htm, 1998.
http://www.viasoft.com/prdcts/autochange, 1998.
http://www.viasoft.com/prdcts/viavldte, 1998.
http://www.viasoft.com/prdcts/bridge2k/, 1998.
R.E.D.–E 2000 brochure from Info Tech, Inc., 1998.

*Primary Examiner*—Thomas G. Black
*Assistant Examiner*—David Jung

[57] ABSTRACT

The invention provides a method for solving, for an interim period of up to seven years, what is commonly known as the year 2000 computer date problem. The method is based on utilizing the presently unused capacity of a two-digit computer month field, which is a constituent part of a six-digit computer date field, in the following manner. Each month in the years 2000 through 2006 is sequentially assigned one unique two-digit number greater than twelve while the year number is kept unchanged, as the dates are encoded and stored into the computer date fields on the computer media and in the computer memory during the years 2000 up through 2006. That ensures that during said period of up to seven years, the date as number keeps increasing with the passage of time and that each date is as number greater than any date in the years 1999 and the previous years, which are the essential requirements for computer's capability to do the manipulation (sort, retrieval, insertion, deletion, archival, etc.) of computer data records by date.

8 Claims, No Drawings

MONTH FIELD DIVISION MULTIPLEXING SOLUTION FOR YEAR 2000 COMPUTER DATE PROBLEM

FIELD OF THE INVENTION

The present invention relates to solving the year 2000 computer date field problem.

BACKGROUND OF THE INVENTION

This application is continuation-in-part of provisional application number 60/037,474 filed Feb. 7, 1997.

A computer is a very complex electromagnetic-mechanical device (machine) which automatically executes sequences (programs) of coded instructions in order to process large quantities of data with very high speed and accuracy. To become computer processible, data has to be previously encoded ("written", stored) on the computer media—such as magnetic tapes, magnetic or optical discs, etc.—or in the computer memory. Further on, when we refer to data we will have in mind the data already encoded on the computer media or in the computer memory.

Computer programs are commonly called software. Computer and related devices viewed as machines without data and software are called hardware. Software can be classified into two major categories: system software and application software. System software coordinates the functions of major computer parts (components), such as CPU, memory, I/O ports, disk and tape drives, monitor, printer, modem, etc., with the processing of data and the transmission of data over large distances. System software also does frequently performed manipulations of data, such as copying, sorting, viewing, etc. The system software under which a computer is operating is usually called the operating system.

Application software are programs that process data in order to achieve specific goals. Depending on the type of data processed and the purpose of processing, application software is classified as financial, engineering, manufacturing, miltary, scientific, etc. Typically, a computer runs under one operating system but executes hundreds of different application programs. System software represents only a small fraction of the total quantity of software; the rest is application software.

The structure of an application program consists of two parts: data definition/description code and data processing code. Data definition/description code describes type, structure, and size of the data to be processed (input data), of the data to be temporarily stored in the memory, and of data which is the final result of the processing (output data). Data processing code effects any combination of the mathematical and the logical operations (comparisons) on the data and manipulations of the data (move, sort, retrieval, insertion, deletion, etc.). Manipulations of data is mostly based on logical operations.

Data related to natural physical and legal entities—such as persons houses, parcels of land, cars, companies, bank accounts, litigation cases, etc.,—is structured in computer data records (or simply, records), usually one record representing one individual entity. A record consists of smaller units of data called fields. A field can contain an identification number, a name, an address, a date, an amount of money, etc. A field which, by its nature, contains only numeric information is called a numeric field. The full range of mathematical and logical operations by computer can only be performed on a numeric field.

We will limit our further discussion of fields to numeric fields only. Numeric fields can contain decimal fractions or whole numbers. A typical numeric field containing decimal fractions is the field representing an amount of money. We will further limit our discussion of numeric fields to those containing whole numbers only. Some examples of such fields are social security number field, telephone number field, sequence number field, date field, etc.

The most important characteristic of a numeric field is its size. The size of a numeric field is the number of digits allocated to the field. For example, the size of a social security number field is 9, the size of a telephone number field is 10, the size of a zip-code field is 5. The size of date fields that are concern of this invention is 6 (2 digits for the year number, 2 digits for the month number, and 2 digits for the day number).

Another important characteristic of a numeric field is its capacity. The capacity of a numeric field is the total number of distinct numbers that can be encoded (written) in the field. For example, the possible zip-code numbers are 00000 and 00001 through 99999, which is a total of 100,000 distinct numbers. Therefore, the capacity of the zip-code field is 100,000 which also can be written as $10^5$. Similarly, the capacity of the social security number field is $10^9$ and the capacity of the telephone number field is $10^{10}$. Generally, for numbers written in decimal system (almost always the case), the following formula expresses the relationship between the size and the capacity of a numeric field for whole numbers: $CAPACITY=10^{SIZE}$.

It is important to keep in mind that a field contains a unit of data encoded on the computer media (tapes, discs, etc.) or in the computer memory. For that reason, when we say field, we really mean a field containing computer encoded and computer processible data, or simply, a computer field. For example, when we say date field, we mean a field containing the date encoded on the computer media or in the computer memory, or simply, a computer date field. When we say month field, which is a constituent part of the date field, we will mean a field containing a month number encoded on the computer media or in the computer memory, or simply, computer month field.

Year 2000 Computer Date Problem (Y2000CDP)

(Description of the Problem to be Solved by the Invention)

When records of data are computer processed for a specific financial purpose (as, for example, to generate statements to notify customers of payments due), then the date(s) on a record becomes a critical information. Many financial computer applications are essentially date-driven. In this section of the specifications it will be said more about the structure and function of the computer date field; the problem that will occur with the computer date field in the year 2000—that is to be solved by this invention—will be explained in detail.

In The United States the date is usually written and printed in month, day, year format. For example, the last date of Year 1999 is December 31, 1999. Very often, however, the date is written and printed by using numbers only, with only two digits used for year number. In such case, December 31, 1999 would be printed as 12/31/99 or 12-31-99. Computer programmers usually refer to these formats as MM/DD/YY or MM-DD-YY formats respectively, or most often as MMDDYY format for date. MM stands for two digits representing the month, DD stands for two digits representig the day, and YY for two digits representing the year. When a date is encoded on the computer media, then MM, DD, and YY, being the constituent parts of the date field, can be cosidered the sub-fields of the date field. We will, however, consider them as fields in their own right and refer to YY as year field, to MM as month field, and to DD as day field. On the computer media (such as tapes, disks, CD ROM's, and also in the computer memory) the date is not encoded in MMDDYY format but in YYMMDD format. The two digits representing the year (YY) are obviously the most significant and must be the leading digits.

For the same reason the two digits representing the month (MM) must come before the two digits representing the day (DD). The principle followed is the one universally used in the numbering system: going from left to right, the digits expressing larger units must come before the digits expressing smaller units. (MMDDYY format used to print the date is clearly contrary to the universally used numbering system and to logical and mathematical principles in general. Its persistent use in the U.S.A. is a good example of how difficult is to change the old habits practiced by most of the population—even if they are illogical and wasteful.)

In Background—Description of Prior Arts we stated the critical importance of the date when records are processed for financial purpose and we also added that many financial applications are essentially date-driven. Now we will give a brief technical explanations of how is that done. In YYMMDD format the date becomes one single six-digit number which keeps increasing with the passage of each day, month, and year. The human concept of before and after is translated into the mathematical concept of less and greater (respectively) which a computer can understand and operate with. This property of the date field is essential for manipulation of records by date (sorting, selection, retrieval, insertion, deletion, archiving, etc.) and for control in general of records by computer. We finish this detailed description of the date field (YYMMDD) by noting that the capacities of each its constituent parts, year-field (YY), month-field (MM), and day-field (DD), is $10^2=100$.

Now we will describe the problem to be solved by this invention.

The problem with YYMMDD format will occur at the beginning of Year 2000. January 1, 2000 will in YYMMDD format look as 000101 (YY=00, MM=01, DD=01), which will be "understood" by the computer as January 1, 1900! 000101 is clearly much smaller than 991231 (YY=99, MM=12, DD=31), which represents December 31, 1999. In the same manner, every date in the year 2000 and subsequent years will as a number be smaller than any date in Year 1999 and the previous years. The critical principle that the date as a number keeps increasing with the passage of time will become violated and no accurate selection, sorting, retrieval, deletion, insertion, archiving, etc., of records based on date will be possible.

That is the problem that this invention is supposed to solve. Further on we will refer to the the described problem as the year 2000 computer date problem and abbreviate it as Y2000CDP.

(It should be noted in passing that more than forty years ago programmers decided to use only two digits for the year field within the date field because computer memory was very expensive and the year 2000 seemed very far-off. This habit was, unfortunately, kept even when computer memory became much less expensive and the the year 2000 much closer. If the format for date were YYYYMMDD, then, obviously, Y2000CDP would not exist.)

Why de we need special inventions to solve an essentially programming problem? Why not recode programs and allocate four digits for the year field? It is easy to answer these questions.

There are millions of date-driven application programs with billions of lines of code. Changing the date format from YYMMDD to YYYYMMDD in their data definition/description codes would be time-consuming and costly enough. But it would not suffice. Many other lines of code that support and perform the manipulation of records based on date would be affected by the change of the date format and would also have to be modified. Most experts agree it is not modifying, but locating all affected lines of code—and not missing any—that is the most formidable part of Y2000CDP.

The purpose of this invention is to avoid the need for recoding as described above.

At this point the readers and evaluators of this invention are urged to read the enclosed articles on Y2000CDP.

After reading the enclosed articles, please read Month Field Division Multiplexing Solution (MMS) for Year 2000 Computer Date Problem (Description of the invention).

BRIEF SUMMARY OF THE INVENTION

The present invention relates to a method of handling dates of a six-digit computer date field, while keeping size and format of the six-digit computer date field, usable for an interim period of up to seven years including the year 2000, utilizing the presently unused capacity of a two-digit computer month field, the computer month field being a constituent part of the six-digit computer date field, including the steps of: assigning an increasing sequence of non-repeating two-digit numbers greater than twelve in a one-to-one manner to months of the period of up to seven years, by using the two-digit numbers greater than twelve in lieu of standard month numbers of 01 through 12, by entering the sequence of two-digit numbers greater than twelve into the two-digit computer month field, and by storing the sequence of the two-digit numbers greater than twelve into computer media and into a computer memory; assigning an assigned two-digit number greater than twelve from the sequence to a date of the period, in accordance with the month and the year of the date of the period, and in accordance with assignment during the step of assigning in the one-to-one manner; storing the date of the period into the computer media and the computer memory, and entering the assigned two-digit number greater than twelve into the two-digit computer month field.

DETAILED DESCRIPTION OF THE INVENTION

Hereafter we will use MMS as the name of this invention. MMS solves Y2000CDP by assigning numbers 13 through 96 to the 84 months (seven years) of the period that starts on January 1, 2000 and ends with December 31, 2006, by selecting one of those numbers (13 thru 96) as the month number, depending on the current month and the year, and by keeping the year number constant and equal to 99, as the dates are entered onto the computer media and the computer memory during said period of seven years. (Please see Table #1.)

Now, of course, we use numbers 01 through 12 for the months of January through December for any year. That means that we are now using only a fraction ($12/99=12\%$) of the maximum usable capacity of MM field, maximum usable capacity being 99. ($99=10^2-1$, where 1 stands for 00 which is, of course, unusable.) MMS is a method (could also be called a scheme or a system) of using that presently unused capacity of MM field. We will now explain in detail how MMS works.

Let's first state that there is no computer date problem in the year 1999. The numbers 01 through 12 are, of course, assigned to the months of January through December of the year 1999. MMS goes into effect on January 1, 2000. The numbers 13 through 24 are assigned to the months of January through December (respectively) of the year 2000; The numbers 25 thru 36 to January thru December of the year 2001; The numbers 37 thru 48 to January thru December of the year 2002; The numbers 49 thru 60 to January thru December of the year 2003; The numbers 61 thru 72 to January thru December of the year 2004; The numbers 73 thru 84 to January thru December of the year 2005; The numbers 85 thru 96 to January thru December of the year 2006.

We see that the range of possible numbers of MM field, which is 01 through 99, is divided into eight non-overlapping (disjoint) intervals, each having a width of 12 and each assigned to one of the years 1999 through 2006. (Numbers 97, 98, and 99 are not used.) In this scheme the month number determines not only the month itself, but also the year, because each of the eight years 1999 through 2006 uses its own unique interval of month numbers, that is, its own unique segment of the capacity the month field.

By analogy with the scheme of multiplexing in telecommunications, we say that in MMS the capacity of MM field (in telecommunicatios we have the capacity of the channel) is divided into eight disjoint number intervals (in telecommunications we have division into disjoint frequency intervals or disjoint time intervals), each of them used by only one of the years 1999 through 2006. For that reason we can call this method Month Field Division Multiplexing (in telecommunications we have Frequency Division Multiplexing or Time Division Multiplexing) and we call this invention Month Field Division Multiplexing Solution (MMS) for Year 2000 Computer Date Problem (Y2000CDP), or simply MMS.

Let's now return to the problem described in Year 2000 Computer Date Problem and explain how MMS solves it. In MMS format January 1, 2000 will look as 991301 (99 for year number, 13 for month number, and 01 for day number), not as 000101 (00 for year number, 01 for month number, and for 01 day number). Now 991301 (January 1, 2000) is a number clearly greater than 991231 (December 31, 1999). Similarly, Jan. 1, 2001 will look as 992501, clearly greater than 992431, which is Dec. 31, 2000.

In every subsequent year through the end of 2006 the month number number (MM) keeps increasing until it reaches 96 for December 2006, while the year number stays constant at 99.

The critical principle that the date as a number keeps increasing with the passage of time remains in effect and the manipulation of records based on date (selection, sorting, retrieval, insertion, deletion, archiving, etc.) remains as feasible as before Year 2000.

Before we close this section we should note that there are no technical difficulties whatsoever in using numbers 97, 98, and 99 for January, February, and March of the year 2007. It is unlikely, however, that such an extension of MMS into the three first months of the year 2007 would be desirable by any user of MMS. MMS must end and be replaced by a permanent solution for Y2000CDP after 99 is used for month number. Therefore, the users of MMS using 97, 98, and 99 for January, February, and March of 2007 (respectively) would end up in an awkward situation of having in their permanent solution for Y2000CDP (YYYY for year-field) the year 2007 lasting only nine months.

We should also add that day numbers are not part of Y2000CDP and, consequently, are not affected by MMS.

Next, please read Implementation of MMS (Implementation of the Invention).

Implementation of MMS (Implementation of the Invention)

Starting January 1, 2000 the users of MMS (computer programmers, computer operators, data entry persons, on-line computer users, etc) will start entering the dates by using the month numbers from Table #1 or from the enclosed MMS calendars and using 99 for year number. They will have to be supplied with the charts similar to Table #1 and with the calendars similar to the enclosed MMS calendars.

During the first year of use of MMS (Year 2000) it will be particularly easy for MMS users to do two-way conversion between the standard month numbers and MMS month numbers, even without looking at MMS calendars. To convert a standard month number into a MMS month number during Year 2000, the users will just have to add 12 to the standard month number; to convert a MMS month number into a standard month number, the users will just have to subtract 12 from the MMS month number.

For example, the MMS month number for September 2000 is 9+12=21; the standard month number for MMS month number 21 is 21–12=9 (September). For Year 2001 the conversion involves adding or subtracting 24; for Year 2002 the conversion involves adding or subtracting 36; for Year 2003, adding or subtracting 48; for Year 2004, adding or subtracting 60; for Year 2005, adding or subtracting 72; and for Year 2006 adding or subtracting 84.

Recipients of statements, bills, invoices, and any other computer printouts using MMS date should be given a MMS calendar for the current year. The MMS calendar on a little leaflet should be enclosed with the correspondence.

In cases where it is an imperative to print the date in the conventional (standard) way, the program code that does the the printing will have to be modified. The modification would likely be based on the methods explained in MMS Date <--> Standard Date Conversion Procedures. In cases of the application programs—data entry programs in particular—that check whether the month number is within 01–12 range, the code that does the checking (validity checking) will have to be disabled or removed. The main challenge in doing such modifications will be in locating the pertinent lines of code if the programs are undocumented.

In cases where the application software gets the current date directly (automatically) from the system software, the code in the system software that generates the date (perpetual calendar) might have to be modified to work as MMS calendar. If the application software happens to be well documented, some users might find it more convenient to create a new routine in the beginning of the application program which would prompt and enable computer operators to override the system date by manually entering the current date in MMS form.

As we mentioned in Background—Description of Prior Arts, system software represents only a very small fraction of the total quantity of software. For that reason any solution of Y2000CDP that shifts the burden of modification from application software to system software will have an important advantage. In cases of MMS users whose application programs are numerous, all with Y2000CDP, all running under the same system software, and all getting the current date from the system software, the modification of the system software calendar (to make it work as MMS calendar) will likely be the way to go.

The ideal candidates for MMS will be the users who can live with the date printed in MMS form (year number "frozen" at 99, month numbers running from 01 to 96), whose application software—especially data entry software—does not do validity check on the month number, and application software does not get the current date automatically from the system software, but by manual daily entry.

For those users who must have the date printed in the conventional form and/or whose application software does validity check on the month number, MMS will still be an attractive solution. The amount of the code that edits and prints the date and that does validity check on the date is very small and localized and will need only a small modification.

One can also think, for example, of the situations when MMS users might have to do some limited modifications of the way they do their data base inquiries or reporting by year. For a computer using MMS all eight years 1999 through 2006 are just the year 1999. To make an inquiry or produce a report for one of these years, an MMS user must specify the beginnig and ending month numbers for the particular year. To do that the user might have to use an MMS calendar or a MMS date conversion table. Or a simple program based on the MMS calendars, or on the MMS date conversion table or formulas, can be written to enable the MMS user to enter the year he needs in the usual way. This discussion of some inconveniences and adjustments that some MMS users will have to accept and get used to should by no means be considered complete, becuse the profiles of the computer users facing the year 2000 computer date problem vary very widely.

It is clear from the above considerations that MMS is not a perfect solution. To implement and utilize MMS, its users will have to make some adjustments and to accept some changes in the way they run and maintain their computer apllications. MMS is proposed as a solution for Y2000CDP with a conviction that its benefits decidedly outweigh various possible inconveniences in its implementation and utilization.

The essence of MMS is that for an interim period of seven years (the years 2000 through 2006) MMS resolves the crux of Y2000CDP; it ensures the inviolability of the principle that date as number must keep increasing with the passage of time. Consequently, MMS ensures that any date in the years 2000 through 2006 is as a number greater than any date in the year 1999 and the previous years.

The critical advantage of MMS is that it does not require the modification of the size and the structure of the six-digit date field and the consequent modification of the software code that would be affected by such modification of the date field. In other words, MMS makes possible for its users to avoid what is expected to be the bulk of the anticipated expenses in solving Y2000CDP.

MMS Date <--> Standard Date Conversion Procedure

The simplest way to do MMS Date <--> Standard Date conversion is by using Table #1. If MMS month number is, for example, 82, then it represents October 2005. Working conversly, we read, for example, that MMS month number for Apri 1, 2001 is 28.

As explained in Implementation of MMS, it is easy to do these conversions even if Table #1 is not available. All we have to know is which number to add (for Standard—MMS conversion) or subtract (for MMS—Standard conversion) for the current year. For April 2001, for example, MMS month number is 4+24=28; for MMS month number 82 (Year 2005), the standard month number is 82−72=10 (October). A computer program can be written with Table #1 built in to do these conversions automatically during years 2000 through 2006.

The conversion can also be done by a computer program based on the following formulas and algorithms (rather than based on Table #1). MMS month no.=Standard month no.+(current year no.−1999)×12; Standard month no.=MMS month no.−(current year no.−1999)×12. For example, for April 2001, MMS month no.=4+(2001−1999)×12=4+2×12= 4+24=28; Standard month no.=28−(2001−1999)×12=28−2× 12=28−24=4.

MMS month number contains the information on both the standard month number and the current year of the year 2000 through year 2006 period. The simplest way to derive both informations from a given MMS number is to use Table #1. We can also use the following algorithm:

Divide MMS month number by 12.

MMS month number: 12=quotient (whole number)+ |remainder (whole number or zero)|:12

If remainder not equal to zero, standard year number=1999+quotient standard month number=remainder;

If remainder equal to zero, standard year number=1999+(quotient−1), standard month number=12 (December).

For example, if MMS month number is 67, then, 67:12=5+ 7:12; quotient=5, remainder=7 (not equal to zero), standard year number=1999+5=2004, standard month number=7 (July).

For month number 96, 96:12=8+0:12, quotient =8, remainder=0 (zero), standard year number=1999+(8−1)=1999+7=2006, standard month number=12 (December).

All of the above procedures and algorithms and computer programs based on them can work only during the seven year period of January 1, 2000 through December 31, 2006.

Some Strategy Considerations Facing Potential MMS Users

The bulk of Y2000CDP situations will occur with users of medium size and large size computer systems (mainframes). This invention (MMS) gives those users an interim period of seven years (Years 2000 through 2006) to devise a permanent solution for their Y2000CDP. The main aspect of the permanent solution will most likely be the replacement of their existing application software with the new microcomputer-based application software which uses YYYYMMDD format for date.

Some evaluators of MMS might view the fact that MMS is not a permanent solution for Y2000CDP as a considerable weakness of MMS. After all, why not devise a permanent solution right away and never have to deal with it again?

The first answer to such possible objections is that many users facing Y2000CDP will have neither enough time nor enough money to devise a permanent solution ready for Year 2000.

The second answer is that, even if they do have enough time and money, it is very likely that they would have to undertake a conversion of their operations to microcomputers in not too distant future anyway. Y2000CDP or no Y2000CDP. Devising and implementing a permanent solution for Y2000CDP by Year 2000 on the existing hardware and software, and then, some years later, doing a conversion to the state-of-the-art microcomputer hardware and software, will likely be considerably more expensive than using MMS for years 2000 through 2006 (or a shorter period) and then, at a convenient time in the future doing a conversion to microcomputers and devising a permanent solution for Y2000CDP as a single project.

An objection to the stated arguments might be as follows: Why not do both conversion to microcomputers and permanent solution for Y2000CDP as one single project to be completed by Year 2000?

The first answer to that is: Fine, for those users whose operations can be done on current microcomputers and who can afford to do it money-wise and time-wise. But it is likely that most of them will find such strategy beyond thir means. The second answer is that some of the users for whom such strategy might be feasible and affordable might consider more prudent to wait several more years before making conversion to microcomputers in order to take advantage of further advances in microcomputer technology.

Every major computer operation is different and the choice of solution for Y2000CDP will depend, not only on the features and cost of a particular solution, but also on the specifics of the applications, operating system, time and expertise available, and priorities imposed by customer needs and legal constraints. For that reason this analysys of possible users' strategy considerations in choosing solution for Y2000CDP had to be general and tentative (which is clearly reflected in the excessive use of the word "likely").

Summary and Scope

This invention is an interim seven-year solution of what is commonly known as the year 2000 computer date problem (Y2000CDP).

Financial computer applications, such as billings, bank statements, IRS statements, etc., are essentially date driven. For computer programs, also called software, computer date is a number which increases with the passage of each day. In such way, the human concepts of before, now, and after is expressed in software code as less than, equal to, and greater than the number representing the current date. Y2000CDP will happen with most of older large computer software. In order to save, on computer memory, only two digit were allocated for the computer year field in the past. A two-digit field cannot hold the numbers greater than 99 (Year 1999). Adding 1 to 99 results in 00, which will be interpreted by computers as Year 1900! That means a complete breakdown of the principle that date as number must keep increasing with the passage of time, the principle essential for computer manipulation (sort, select, deletion, insertion, archival, etc.) of computer records by date.

This invention, whose full name is Month Field Division Multiplexing Solution of Year 2000 Computer Date Problem, which we abbreviate as MMS, solves the year 2000 computer date problem by utilizing the presently unused capacity of the computer month field. The month field is also a two-digit numeric field and as such can store the numbers up to 99. Presently we use it, of course, to store the standard month numbers 01 through 12. That means that we are presently using only 12% of the total capacity of the computer month field.

In MMS the numbers 13 through 96 are assigned sequentially and one-to-one to the eighty-four months of the years 2000 through 2006 and stored in the computer month field within the computer date field, depending on the particular date in the same seven-year period. During the years 2000 trough 2006 the year number in the computer year field within the computer date field is kept constant and equal to 99. MMS does not affect the day numbers in the computer day field within the computer date field.

Such method ensures that MMS dates as numbers keep increasing during the years 2000 through 2006 and that every date during that seven-year period is as a number greater than any date in the year 1999 and the previous years, which is essential for computer manipulation of computer data records by date. During the seven years of its applicability MMS eliminates the need for the expansion of the computer year field from two to four digits and the consequent modification of the affected software code, which will be, according to most experts, by far the bulk of the anticipated expenses related to Y2000CDP. The users of MMS will be supplied with computer-programmable charts, calendars, and formulas for an easy two-way conversion between MMS and standard dates.

Although the description above contains certain specificities, these should not be construed as limiting the scope of the invention but merely providing a detailed description of the presently preferred options available within the general approach of this invention, which is the utilization of the presently unused capacity of the computer month field. Thus the scope of this invention should be determined by the appended claims rather than the specificities given.

I claim:

1. A method of handling dates of a six-digit computer date field, while keeping size and format of the six-digit computer date field, usable for an interim period of up to seven years including the year 2000, utilizing the presently unused capacity of a two-digit computer month field, the computer month field being a constituent part of said six-digit computer date field, comprising the steps of:

assigning an increasing sequence of non-repeating two-digit numbers greater than twelve in a one-to-one manner to months of said period of up to seven years, by using the two-digit numbers greater than twelve in lieu of standard month numbers of 01 through 12, by entering the sequence of two-digit numbers greater than twelve into said two-digit computer month field, and by storing the sequence of said two-digit numbers greater than twelve into computer media and into a computer memory;

assigning an assigned two-digit number greater than twelve from the sequence to a date of said period, in accordance with the month and the year of said date of said period, and in accordance with assignment during said step of assigning in the one-to-one manner; and storing said date of said period into the computer media and the computer memory, and entering said assigned two-digit number greater than twelve into said two-digit computer month field.

2. The method of claim 1, wherein said period includes years 2000, 2001, 2002, 2003, 2004, 2005, and 2006.

3. The method of claim 1, further comprising the steps of:
saving a year number in a computer year field, said year number being greater than ninety-eight; and
setting said year number to be constant during said step of storing said date of said period.

4. The method of claim 1, further comprising the steps of:
converting said assigned two-digit number greater than twelve to the month and the year of said period; and displaying the month and the year of said period.

5. The method of claim 2, further comprising the steps of:

converting said assigned two-digit number greater than twelve to the month and the year of said period; and displaying the month and the year of said period.

6. The method of claim 1, further comprising the steps of:

permitting entry, through manual and computer-programmable means, of a date conversion table, a plurality of special calendars, and a plurality of formulae and procedures.

7. The method of claim 2, further comprising the steps of:

permitting entry, through manual and computer-programmable means, of a date conversion table, a plurality of special calendars, and a plurality of formulae and procedures.

8. The method of claim 4, further comprising the steps of:

permitting entry, through manual and computer-programmable means, of a date conversion table, a plurality of special calendars, and a plurality of formulae and procedures.

* * * * *